(12) United States Patent
Cole

(10) Patent No.: US 6,204,780 B1
(45) Date of Patent: Mar. 20, 2001

(54) METHOD AND CIRCUITRY FOR COMPRESSING AND DECOMPRESSING DIGITAL VIDEO DATA

(75) Inventor: Anthony James Carvallo Cole, Bristol (GB)

(73) Assignee: SGS-Thomson Microelectronics Limited, Almondsbury Bristol (GB)

( * ) Notice: Subject to any disclaimer, the term of this patent is extended or adjusted under 35 U.S.C. 154(b) by 0 days.

(21) Appl. No.: 09/091,600

(22) PCT Filed: Oct. 29, 1997

(86) PCT No.: PCT/GB97/02984

§ 371 Date: Jun. 16, 1998

§ 102(e) Date: Jun. 16, 1998

(87) PCT Pub. No.: WO98/19463

PCT Pub. Date: May 7, 1998

(30) Foreign Application Priority Data

Oct. 31, 1996 (GB) .................................................. 9622725

(51) Int. Cl.[7] .................................................. H03M 11/00
(52) U.S. Cl. .................................................. 341/50; 341/67
(58) Field of Search .................................................. 341/50, 65, 67; 348/408, 405; 358/433; 382/251

(56) References Cited

U.S. PATENT DOCUMENTS

| | | | |
|---|---|---|---|
| 5,278,647 | 1/1994 | Hingorani et al. | 358/136 |
| 5,374,958 | 12/1994 | Yanagihara | 348/405 |
| 5,455,874 | * 10/1995 | Ormsby et al. | 382/251 |
| 5,475,502 | * 12/1995 | Lee et al. | 358/433 |
| 5,510,785 | * 4/1996 | Segawa et al. | 341/67 |
| 5,543,844 | * 8/1996 | Mita et al. | 348/405 |
| 5,553,200 | * 9/1996 | Accad | 395/109 |
| 5,606,372 | * 2/1997 | Kim | 348/408 |
| 5,832,130 | * 11/1998 | Kim | 382/248 |

FOREIGN PATENT DOCUMENTS

| | | | |
|---|---|---|---|
| 0 687 111 | 4/1996 | (EP) | H04N/7/24 |
| 0 707 426 | 4/1996 | (EP) | H04N/7/26 |

* cited by examiner

Primary Examiner—Michael Tokar
Assistant Examiner—Peguy Jean Pierre
(74) Attorney, Agent, or Firm—Wolf, Greenfield & Sacks, P.C.; James H. Morris; Theodore E. Galanthay

(57) ABSTRACT

According to the present invention circuitry is provided for processing digital data items. The circuitry comprises compression and decompression circuitry. The compression circuitry further comprises: a circuit for transforming M number of data items into N number of data items; a circuit for quantising P number of data items and producing Q number of data items; and a circuit for appropriately storing in memory and/or transferring R number of data items. The decompression circuitry comprises: a circuit for appropriately retrieving from memory and/or receiving S number of data items; a circuit for dequantising T number of data items and producing U number of dequantised data items; and a circuit for receiving and inverse transforming V number of data items into W number of data items, said W data items being representative of said M data items.

30 Claims, 6 Drawing Sheets

METHOD AND CIRCUITRY FOR COMPRESSING AND DECOMPRESSING DIGITAL VIDEO DATA

BACKGROUND OF THE INVENTION

1. Field of the Invention

The present invention relates to a method and circuitry for compressing and decompressing digital data.

More particularly, the present invention relates to a method and circuitry for respectively compressing and decompressing digital data to and from a frequency domain representation.

One particular application, inter alia, or the present invention is in MPEG-2. While this document will focus on MPEG-2 as an application of the present invention, it should be understood that the MPEG-2 application is to be considered as an exemplification of an application of the present invention and that there is no intention of limiting the applications to which the present invention can be applied.

2. Background Art

Digital video decoders such as MPEG-2 require up to two previously decoded frames to generate the frame currently being decoded.

Each frame consists of three color components: luminance Y and two chrominance U, V. Each color component may be stored as a single frame or two fields, depending upon the implementation.

It should be noted that throughout this entire text, unless otherwise stated, one Y, U or V component pixel is represented by one byte and 1 KByte represents 1024 bytes.

The luminance component Y for each 'PAL standard' frame comprises 720×576 pixels per frame, which therefore requires 405 KBytes of memory per luminance component Y per frame. Each of the two chrominance components U and V for each 'PAL standard' frame comprises 360×288 pixels per frame, which therefore requires a total of 2×101.25 KBytes (202.5 KBytes) of memory per chrominance components U, V per frame. Therefore, each 'PAL standard' frame requires 607.5 KBytes of memory in order to store the luminance Y and chrominance U, V information.

It should be understood that even though the 'PAL standard' has been referenced above, the principle also applies to other standards, for example NTSC.

As stated earlier, in MPEG-2 there is a requirement for storing up to two previously decoded frames, i.e. a total of 1215 KBytes, in addition to the frame currently being decoded, i.e. 607.5 KBytes. Therefore, there is a requirement for storing up to 1822.5 KBytes of data in memory.

MPEG-2 as well as many other video/image compression methods and apparatus, for example, JPEG, H.261 and H.263, divide each of the three colour components Y, U and V into 8×8 blocks and then transform each block into a representative frequency domain block using an 8×8 two-dimensional Discrete Cosine Transform (DCT). Each frequency domain coefficient block is then quantized with the higher frequency coefficients being quantized to a greater extent than the lower frequency coefficients. This therefore results in a loss of information with many of the high frequency coefficients typically having values that become zero. The quantized coefficients are then run-length encoded using a zig-zag pattern and finally Huffman encoded. The resulting compressed block is thus not of a fixed size.

One disadvantage of the state of the art MPEG decoders is that they require two mega-bytes (2 MBytes) of memory in which to store the data. Another disadvantage of these MPEG decoders is that they have high memory bandwidth requirements. The more the memory requirements are, the more expensive, both in terms of cost, space and efficiency a system becomes.

OBJECTS & SUMMARY OF THE INVENTION

Accordingly, an object of the present invention is to overcome the disadvantages and inconveniences of the state of the art.

Another object of the present invention is to reduce the amount of memory required for storing digital data.

Another object of the present invention is to compress digital data as it is written to memory, or transmitted, and decompress compressed digital data when read from memory, or received, using simple operations.

Another object of the present invention is to provide a variable compression/decompression ratio.

Other objects of the present invention are to keep to a minimum the read/write latency and to reduce the memory or transmission bandwidth requirements.

Another object of the present invention is to fix the size of the compressed data so as to enable simple address calculation for random memory access.

In order to achieve these objects, the present invention proposes circuitry for processing digital data items. The processing circuitry could, for example, be incorporated as part of an MPEG decoder for processing digital video/image data items. The circuitry further comprises compression circuitry and decompression circuitry, said compression circuitry comprising: a circuit for receiving and transforming M first data items into N second data items, where M is an integer greater than or equal to two and where N is an integer less than or equal to M; a circuit for receiving and quantising P second data items and producing Q third data items, where P is an integer less than or equal to N and where Q is an integer less than or equal to P; and a circuit for appropriately storing in memory and/or transferring R third data items; where R is an integer less than or equal to Q, said decompression circuitry comprising: a circuit for appropriately retrieving from memory and/or receiving S first data items, where S is greater than or equal to R; a circuit for receiving and dequantising T first data items and producing U dequantised second data items, where T is greater than or equal to S and U is greater than or equal to T; and a circuit for receiving and inverse transforming V second data items into W third data items, where V is greater than or equal to U and where W is greater than or equal to V, said W third data items being representative of said M first data items.

According to another embodiment of the present invention, the compression circuitry further comprises a circuit for truncating the N second data items and producing N' second truncated data items, where N' is an integer less than or equal to N and where P is an integer less than or equal to N'.

According to another embodiment of the present invention, the compression circuitry further comprises a circuit for range clamping the Q third data items and producing Q' third range clamped data items, where Q' is an integer less than or equal to Q and where R is an integer less than or equal to Q'.

According to another embodiment of the present invention, the decompression circuitry further comprises a circuit for range clamping the W third data items and producing W' third range clamped data items, where W' is an integer less than or equal to W, said W' third range clamped data items being representative of said M first data items.

According to another embodiment of the present invention, the number M of first data items equals $2^Y$, where Y is an integer greater than or equal to one.

According to another embodiment of the present invention, the P second data items are quantised, i.e. compressed, independently of each other and the T first data items are dequantised, i.e. decompressed, independently of each other.

The present invention also proposes a method for processing digital data items. The processing method could, for example, be incorporated as part of an MPEG decoder for processing digital video/image data items. The method comprises the steps of compressing and decompressing the digital data items. The step of compressing further comprises the steps of: receiving and transforming M first data items into N second data items, where M is an integer greater than or equal to two and where N is an integer less than or equal to M; receiving and quantising P second data items and producing Q third data items, where P is an integer less than or equal to N and where Q is an integer less than or equal to P; and appropriately storing in memory and/or transferring R third data items; where R is an integer less than or equal to Q. The step of decompressing said decompression comprising further comprises the steps of: appropriately retrieving from memory and/or receiving S first data items, where S is greater than or equal to R; receiving and dequantising T first data items and producing U dequantised second data items, where T is greater than or equal to S and U is greater than or equal to T; and receiving and inverse transforming V second data items into W third data items, where V is greater than or equal to U and where W is greater than or equal to V, said W third data items being representative of said M first data items.

According to another embodiment of the present invention, the compressing step further comprises a step for truncating the N second data items and producing N' second truncated data items, where N' is an integer less than or equal to N and where P is an integer less than or equal to N'.

According to another embodiment of the present invention, the compressing step further comprises a step for range clamping the Q third data items and producing Q' third range clamped data items, where Q' is an integer less than or equal to Q and where R is an integer less than or equal to Q'.

According to another embodiment of the present invention, the decompressing step further comprises a step for range clamping the W third data items and producing W' third range clamped data items, where W' is an integer less than or equal to W, said W' third range clamped data items being representative of said M first data items.

According to other embodiment of the present invention, the circuitry and/or method is incorporated or used in a system or apparatus, where the system or apparatus is, or is incorporated within, or is used in conjunction with, a; computer; a domestic or consumer appliance such as a set top box, TV, HiFi etc.; a vehicle as part of a positioning system/apparatus (GPS); or a telephone or a telephone network.

BRIEF DESCRIPTION OF THE DRAWINGS

These and other objects, as well as other advantages and features, of the present invention will become apparent in light of the following detailed description and accompanying drawings among which.

DETAILED DESCRIPTION OF THE INVENTION

In the following diagrams, where the same or similar elements appear, they will be denoted in the same manner unless otherwise stated.

Figure 1:
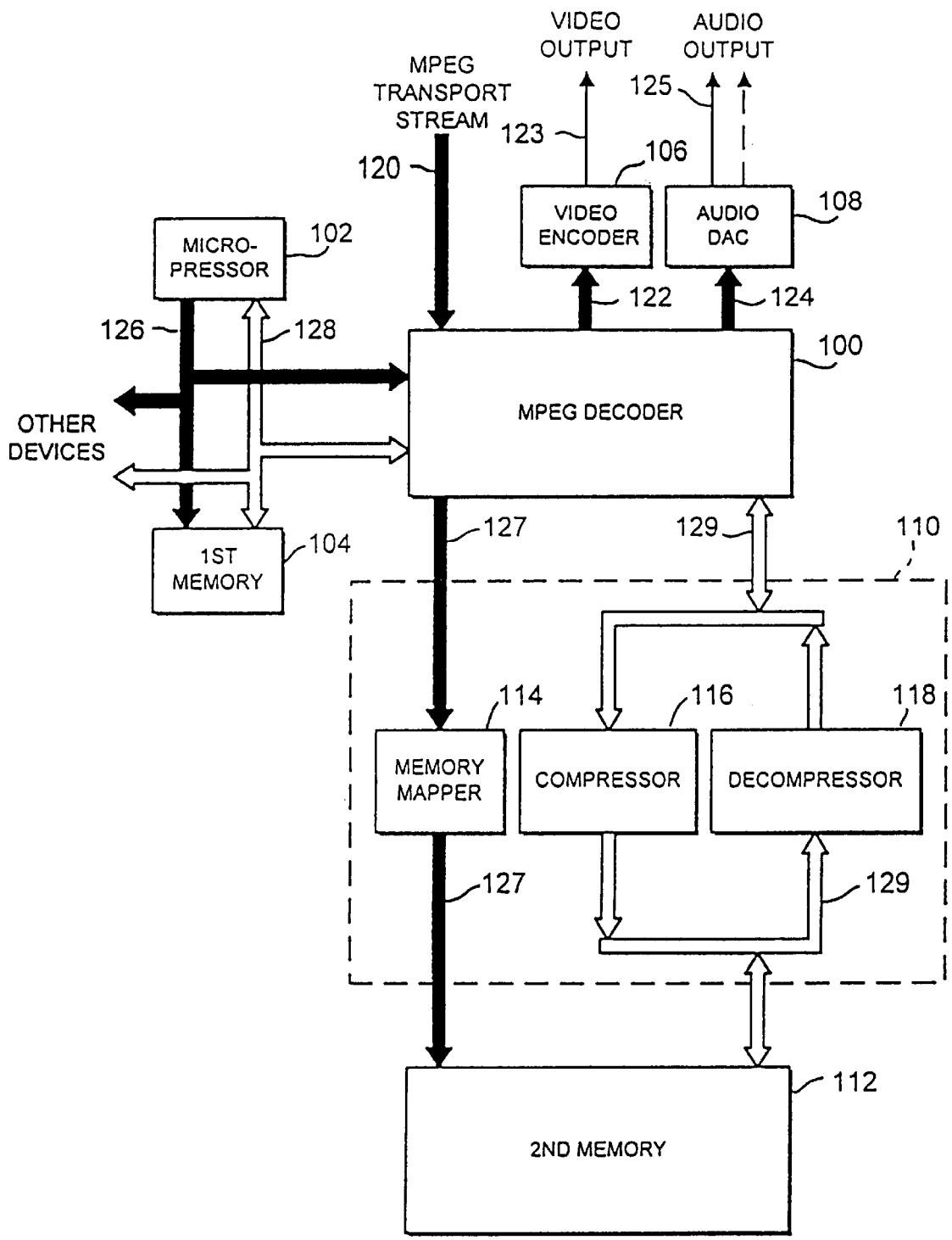
FIG. 1 illustrates an embodiment of a basic block diagram of an MPEG-2 video decoder with video memory compression/decompression according to the present invention.

FIG. 1 illustrates an embodiment of a basic block diagram of an MPEG-2 video decoder with video memory compression/decompression according to the present invention.

This figure comprises: an MPEG decoder 100; a microprocessor 102; a first memory 104, that is associated with the microprocessor 102; a video encoder 106; an audio DAC 108; digital video compression and decompression circuitry 110; and a second memory 112, that is associated with the decoder 100.

The digital video compression and decompression circuitry 110 further comprises: memory mapping circuitry 114; compression circuitry 116; and decompression circuitry 118.

The decoder 100 has a number of inputs and outputs that include: an input data bus 120 that inputs MPEG transport streams into the decoder 100; a video output bus 122 that outputs digital video data from the decoder 100, the output 123 of the video encoder 106 outputs an analog video signal in the form of an RGB or composite signal for example; a audio output bus 124 that outputs digital audio data from the decoder 100, the output 125 of the audio DAC 108 outputs an analog audio signal, or audio signals in the case of stereo audio output; a first address bus 126, which is associated with the microprocessor 102, that inputs address data into the decoder 100 from the microprocessor 102; a first bi-directional data bus 128, which is associated with the microprocessor 102, that operatively interconnects the decoder 100, the microprocessor 102 and the microprocessor memory 104; a second address bus 127, which is associated with the decoder 100, that outputs address data from the decoder 100 to the decoder memory 112 via the memory mapping circuitry 114; and a second bi-directional data bus 129, which is associated with the decoder 100, that operatively interconnects the decoder 100 and the decoder memory 112 via the compressor 116 and decompressor 118.

It should be noted that the microprocessor 102 also: operatively inputs and outputs address and data information to and/or from other devices such as a serial UART, a smart card reader or a front panel (none of which are illustrated) for example; and inputs and outputs control data via a control bus (not illustrated).

Figure 2:
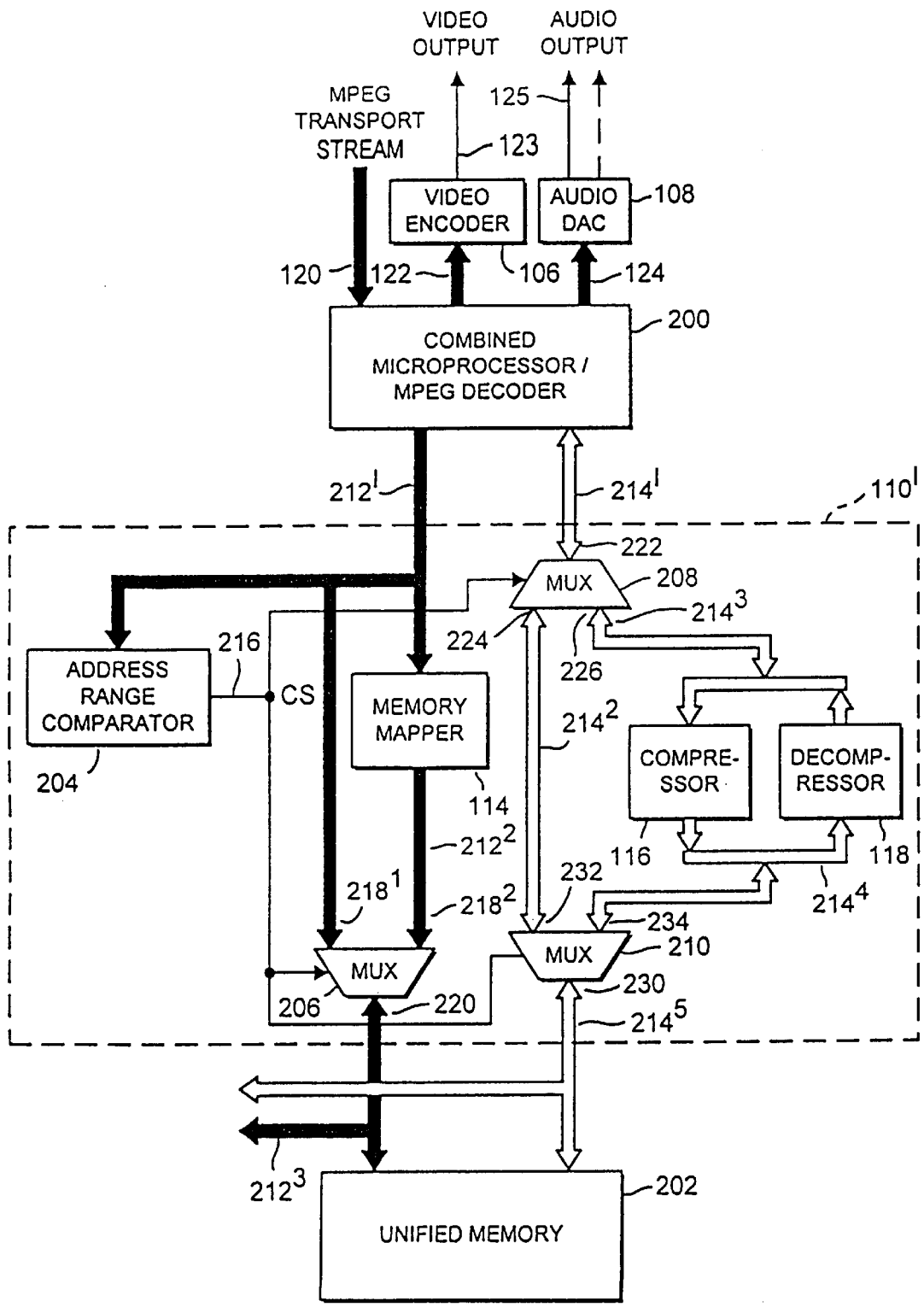
FIG. 2 illustrates an embodiment of a basic block diagram of an MPEG-2 video decoder with a unified memory, a combined MPEG decoder and microprocessor and a video memory compressor/decompressor according to the present invention.

FIG. 2 illustrates an embodiment of a basic block diagram of an MPEG-2 video decoder with a unified memory, a combined MPEG decoder and microprocessor and a video memory compressor/decompressor according to the present invention.

This figure comprises: a combined MPEG decoder (100) and microprocessor (102) 200; a unified microprocessor (104) and decoder memory (112) 202; the video encoder 106 and the audio DAC 108, both as illustrated in FIG. 1; and digital video compression/decompression circuitry 110' that is similar to that illustrated in FIG. 1.

The digital video compression/decompression circuitry 110' further comprises: the memory mapping circuitry 114, the compression circuitry 116 and the decompression circuitry 118, as illustrated in FIG. 1; an address range comparator 204; a uni-directional address bus multiplexer 206; and first and second bi-directional data bus multiplexers 208, 210.

The combined MPEG decoder and microprocessor 200 has a number of inputs and outputs that include: the input data bus 120; the video output bus 122 and analog output 123; and the audio output bus 124 and analog output 125; all as illustrated and described in connection with FIG. 1; it further comprises: an address bus $212^1$–$212^3$; and a bi-directional data bus $214^1$–$214^5$.

The address bus $212^1$ operatively interconnects the combined MPEG decoder and microprocessor 200 to the address range comparator 204, the memory mapping circuitry 114 and the address bus multiplexer 206. The data bus $214^1$ operatively interconnects the combined MPEG decoder and microprocessor 200 and the first data bus multiplexer 208.

The address range comparator 204 receives address data from the address bus $_{212}{}^1$ and outputs, via an output terminal 216, a control signal CS that operatively controls the three multiplexers 206, 208, 210.

The address bus multiplexer 206 has first and second inputs $218^1$, $218^2$ and an output 220. The first and second inputs $218^1$, $218^2$ are respectively connected to the address buses $212^1$ and $212^2$: the first input $218^1$ being directly connected to the address bus $212^1$ and the second input $218^2$ being indirectly connected to the address bus $212^1$ via the address bus $212^2$ and the memory mapping circuitry 114. The output 220 of first multiplexer 206 constitutes the address bus that effectively connects the combined MPEG decoder and microprocessor 200 to the unified memory 202 and other devices (not illustrated).

The first and second data bus multiplexers, respectively 208 and 210, that each respectively have first, second and third bi-directional terminals 222, 224, 226 and 230, 232, 234.

The first terminal 222 of the first multiplexer 208 is connected to the data bus $214^1$. The second terminal 224 of the first multiplexer 208 is connected to the second terminal 232 of the second multiplexer 210 via the bus $214^2$. The third terminal 226 of the first multiplexer 208 is operatively connected to the third terminal 234 of the second multiplexer 210 via the compression and decompression circuitry 116 and 118 and data buses $214^3$ and $214^4$. The first terminal 230 of the second multiplexer 210 is connected to the data bus $214^5$, which effectively constitutes the data bus that connects the combined MPEG decoder and microprocessor 200 to the unified memory 204 and other devices (not illustrated).

The example illustrated in FIG. 2 requires the address range comparator 204, address bus multiplexer 206 and data bus multiplexers 208, 210 in order to allow only the video/image area within the unified memory 202 to receive compressed video/image data, all other areas within the unified memory 202 will received all other uncompressed data. This concept of partitioning a memory is commonly referred to in the art as memory mapping and is known to those skilled in the art. Suffice to say, this memory mapping concept involves providing a video/image area(s) i.e. a video/image memory address range(s) that is virtual, that is to say, the video/image memory address range(s) are not physical memory locations. The memory mapping circuitry 114 converts a virtual video/image address location and maps it to a suitable video/image memory address and in so doing, the compressed video/image data can be packed. Such packing results in less space being taken up in memory, which according to the present invention is advantageous. The memory mapping circuitry 114 contains registers (not illustrated) so that the virtual address range(s) and the physical address range(s) can be set-up.

It should be noted that the combined MPEG decoder and microprocessor 200 operatively inputs and outputs control data via a control bus (not illustrated).

It should also be noted in connection with FIGS. 1 and 2 that in addition to, or as an alternative, the data on the data buses 129 or $214^5$ may be transmitted and/or received from an alternative medium such as a disc, whether a compact, hard or floppy disc, or a serial data line for example.

As described above, an MPEG-2 video decoder stores each frame as three components: luminance Y and two chrominance U and V. Each of these three components Y, U and V are 8-bit per pixel monochrome images. According to the present invention these three components Y, U, V can either be collectively, separately, or any combination thereof, compressed and decompressed as frame components as they are written and read to and from memory or transmitted and received.

For simplicity and brevity the following will be described in relation to FIG. 1, but it will be understood that it is also applicable, by analogy, to FIG. 2, and the alternatives to FIGS. 1 and 2.

In an MPEG-2 system the digital video/image compression and decompression circuitry, respectively 116 and 118, is situated between the decoder 100 and the decoder memory 112.

Figure 3B:
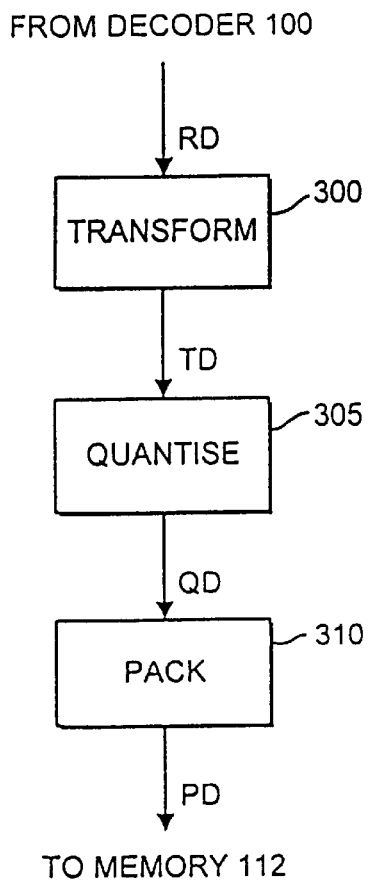
FIGS. 3a and 3b illustrates embodiments of basic block diagrams of compression circuitry according to the present invention.
Figure 3A:
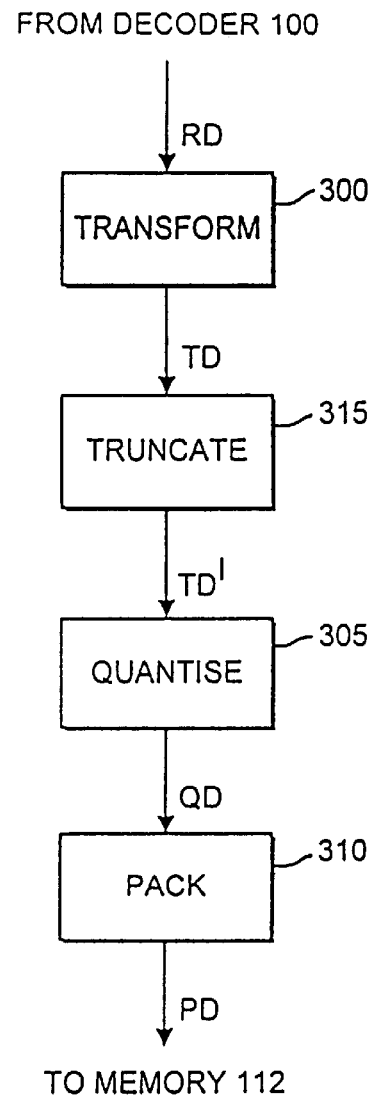

FIG. 3a illustrates an embodiment of a basic block diagram of the compression circuitry according to the present invention.

In this figure, the compression circuitry 116 is shown as comprising: circuitry 300 for transforming data RD received from the decoder 100 (not illustrated) and providing transformed data TD; circuitry 305 for receiving and quantising transformed data TD and providing quantised data QD; and circuitry 310 for receiving and packing quantised data QD and providing packed data PD for storage into memory 112 or transmission (neither illustrated).

FIG. 3b illustrates another embodiment of a block diagram of the compression circuitry according to the present invention.

In this figure, the compression circuitry 116 is shown as further comprising, in addition to the circuitry illustrated in FIG. 3a, circuitry 315 for receiving and truncating the transformed data TD so as to provide truncated data TD' to the quantising circuitry 305.

Figure 4A:
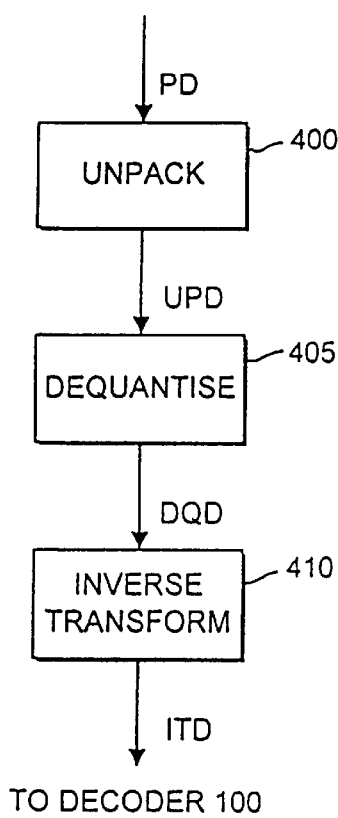
FIGS. 4a and 4b illustrate embodiments of basic block diagrams of decompression circuitry according to the present invention.

FIG. 4a illustrates an embodiment of a basic block diagram of the decompression circuitry according to the present invention.

In this figure, the decompression circuitry 118 is shown as comprising: circuitry 400 for unpacking packed data PD that is received from memory 112 (not illustrated) and providing unpacked data UPD; circuitry 405 for receiving and dequantising unpacked data UPD and providing dequantised data DQD; and circuitry 410 for receiving and inverse transforming dequantised data DQD and providing inverse transformed data ITD to the decoder 100 (not illustrated).

Figure 4B:
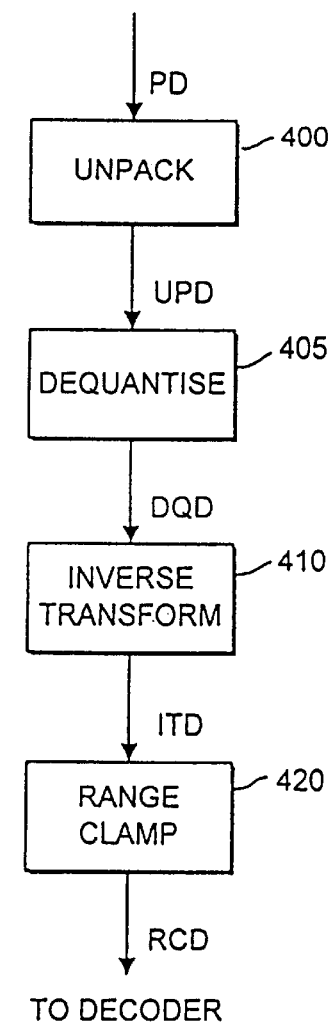

FIG. 4b illustrates another embodiment of a block diagram of the decompression circuitry according to the present invention.

In this figure, the decompression circuitry 118 is shown as further comprising, in addition to the circuitry illustrated in FIG. 4a: circuitry 420 for range clamping the inverse transformed data ITD and providing range clamped data RCD to the decoder 100 (not illustrated).

The principle regarding range clamping can be illustrated in the following example. Take for example 10-bits of signed digital data, which would have a range of +511 to −512. To range clamp this to unsigned data in the range of 0 to 255, for example, requires 8-bits of data. Therefore, if the value of the 10-bit data is less than or equal to 0 then its value is range clamped to 0 and if the value of the 10-bit data is greater than or equal to 225 then it is range clamped to 255.

Figure 5:
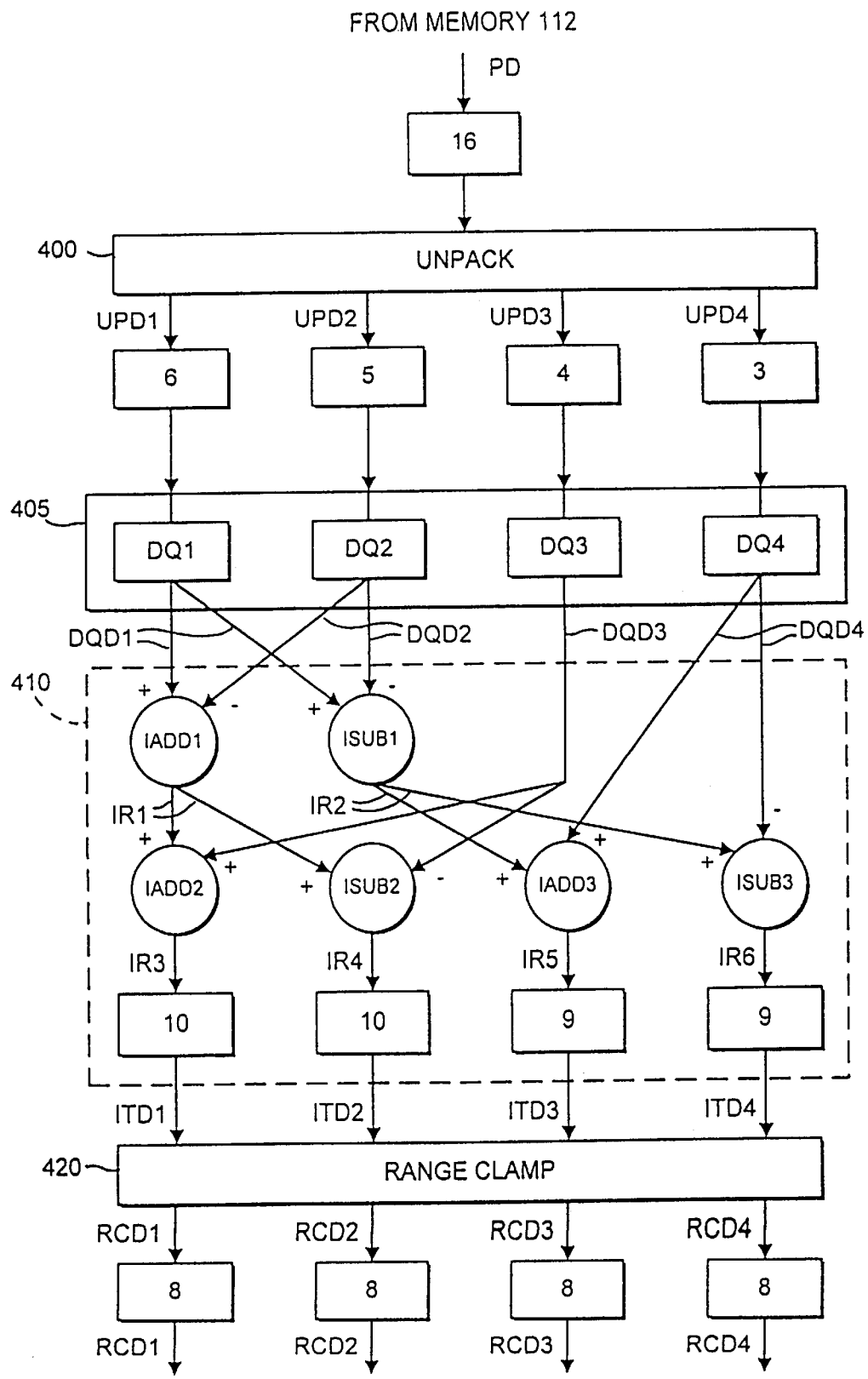
FIG. 5 illustrates a detailed embodiment, according to the present invention, of the block diagram illustrated in FIG. 3b.

FIG. 5 illustrates a detailed embodiment, according to the present invention, of the block diagram illustrated in FIG. 3b.

It should be noted that, by empirical research, it was found that, in the case of a desired 50% compression ratio, for example, for an MPEG-2 decoder, optimum results were obtained when four received data items RD1–RD4, each of 8-bits, i.e. 32-bits in total, were mathmatically manipulated to produce four transformed data items TD1–TD4. Depending upon a particular application, the number of received data items and the number of bits per item can be altered to suit the particular application and the degree of optimisation required. The compression ratio is dependant upon the degree of quantisation and truncation (where truncation is exercised).

The nature of the empirical research was by trial and error. Effectively, the signal-to-noise (S/N) ratio of an output image is compared essentially to its original image, which acts as the metric. The S/N ratio can be approximated by visual inspection of the high and low frequency components of the image, i.e. the sharpness and intensity/contrast of the image. Alternatively, the S/N ratio can be accurately determined boy the following formula:

$$PNSR = 10\log_{10} \frac{255^2}{RMSe}$$

where PSNR is the Peak Signal-to-Noise Ratio; and $$RMSe = \sqrt{\frac{1}{N}\sum_{i=0}^{N-1}(s_i - t_i)^2}$$

where $S_i$ is the signal, $t_i$ is the signal with noise and N is the number of signal data samples.

The above formula can be run as part of a computer program so as to accurately determine the signal-to-noise ratio. A computer program that is capable of accurately determining the signal-to-noise ratio is illustrated in Annex 1.

In this figure, the circuitry 300 for transforming the four sets of data items RD1–RD4, that are received from the decoder 100 (not illustrated), and providing transformed data items TD1–TD4, comprises three circuits for adding data items ADD1–ADD3 and three circuits for subtracting data items SUB1–SUB3.

Circuit ADD1 adds together the contents of the received data RD1 and RD2 to produce a resultant R1. Circuit SUB1 subtracts the contents of RD2 from the contents of RD1 to produce a resultant R2. Circuit ADD2 adds together the contents of the received data RD3 and RD4 to produce a resultant R3. Circuit SUB2 subtracts the contents of RD4 from the contents of RD3 to produce a resultant R4. Circuit ADD3 adds together the resultants R1 and R3 to produce a resultant R5. Circuit SUB3 subtracts the resultant R3 from the resultant R1to produce a resultant R6.

Due to the mathematics, which is explained in more detail below, used to obtain the resultants: R5 appears as an unsigned data item, i.e. a positive value data item, of ten bits; R6 appears as an signed data item, i.e. a data item that could have a positive or negative value, of ten bits; and R2 and R4 appear as signed data items each of nine bits.

In the frequency domain the resultant: R5 represents a DC coefficient that corresponds to the transformed data item TD1; resultant R6 represents a low frequency AC coefficient that corresponds to the transformed data item TD2; and resultants R2 and R4 represent high frequency AC coefficiants that respectively correspond to the transformed data items TD3 and TD4.

It should be noted at this stage, depending upon a particular application, one or more of the frequency coefficents could be ommitted from the following truncation and/or quantising stages in order to suit the particular application and the degree of optimisation required.

According to the present invention, it is preferable, although not necessary, to truncate the transformed data items TD1–TD4 to their original bit size of 8-bits by the use of truncation circuitry 315. Truncation can be performed by a simple shift-right operation(s), which is the same as dividing by two for each shift right operation.

The truncated data items TD1'–TD4' are respectively quantised by the quantising circuitry 305, that comprises quantising circuits Q1–Q4, to produce quantised data items QD1–QD4. Quantisation can be achieved, for example, by using a look-up-table that divides each quantised data item TD1'–TD4' by predetermined values so as to produce the quantised values QD1–QD4. The data in the look-up-table can be linear or non-linear.

Again, by empirical research, it was found that, in the case of a 50% compression ratio for an MPEG-2 decoder, optimum signal-to-noise results, for a given particular set of images (the more complex the better), were obtained when the respective values of TD1'–TD4' were divided by the linear data values 4, 8.75, 14.75 and 14.75.

It is worth noting that a 50% compression ratio results in memory mapping that would be a simple divide by two operation.

In this particular example, and according to the invention, range clamping was incorporated as part of the quantising process (not illustrated) so that the resultant values QD1–QD4 are respectively represented by range clamped 6-bit, 4-bit, 3-bit and 3-bit data items, i.e. 16-bits in total. It should be noted that the resultant values QD1–QD4 can have their values clamped by range clamping circuitry (not illustrated) after quantisation as oppossed to the range clamping being incorporated as part of quantising.

The quantised and range clamped data items QD1–QD4 are received by the packing circuitry 310 which concatenates the 6-bit, 4-bit, 3-bit and 3-bit data items into a data structure, for example a 16-bit data item, that best suits the memory 112 partitioning and accessing, or transmission medium and target.

The decompression process is essentially the reverse process of the compression process.

Figure 6:
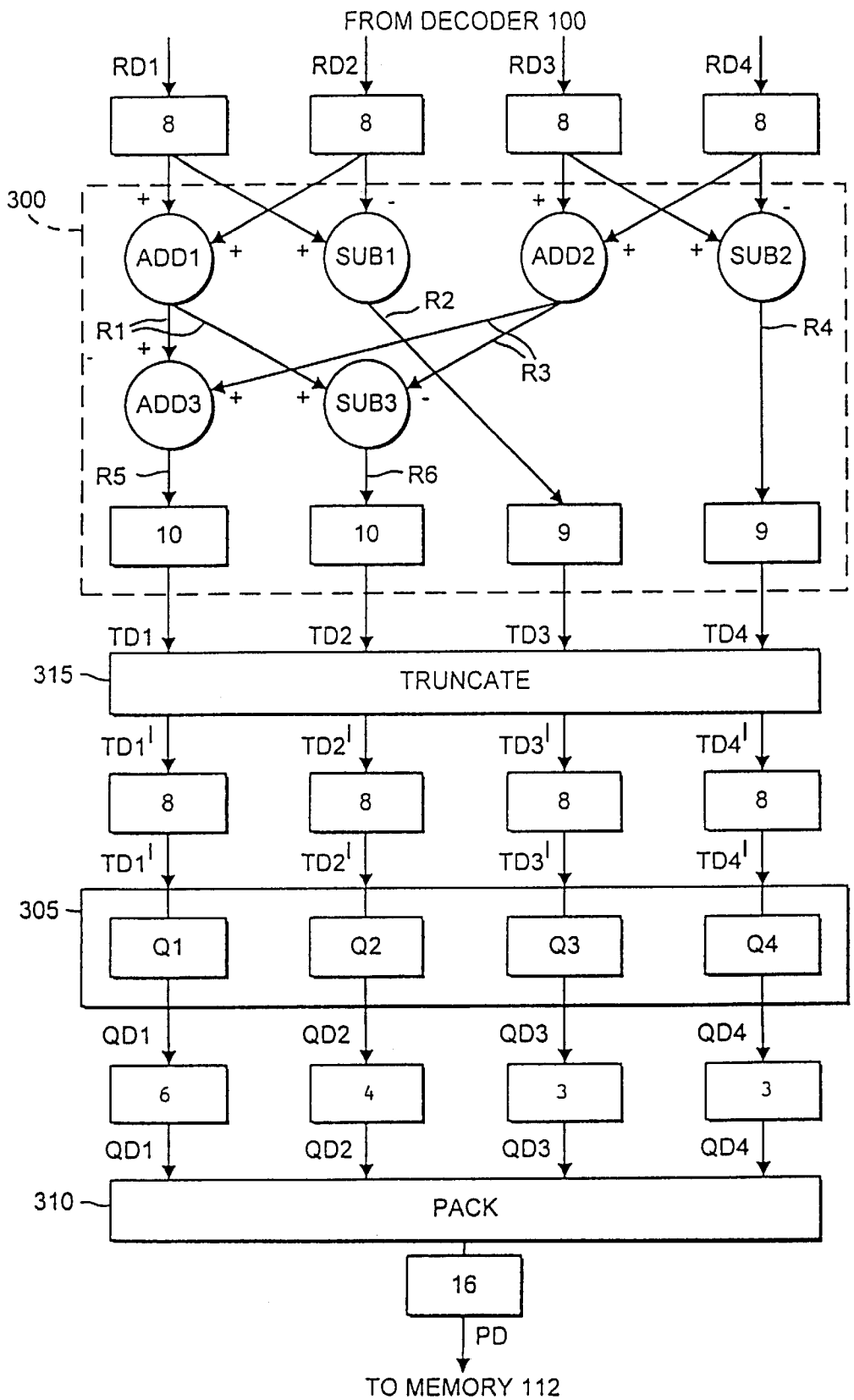
FIG. 6 illustrates a detailed embodiment, according to the present invention, of the block diagram illustrated in FIG. 4b.

FIG. 6 illustrates a detailed embodiment, according to the present invention, of the block diagram illustrated in FIG. 4b.

The 16-bit packed data items PD illustrated in FIG. 5 are retrieved from memory 112 (not illustrated), or received, and unpacked by the unpacking circuitry 400 preferably in the order in which they were packed, so as to produce unpacked data items UPD1–UPD4 that are respectively made up of 6-bit, 4-bit, 3-bit and 3-bit data items.

The unpacked data items UPD1–UPD4 are respectively dequantised by the dequantising circuitry 405, that comprises dequantising circuits DQ1–DQ4, to produce dequantised 8-bit data items DQD1–DQD4. Dequantisation can be achieved, for example, by using a look-up-table that multiplies the data items UPD1–UPD4 by predetermined coefficiants. Again the data in the inverse look-up-tables can be linear or non-linear.

Again, by empirical research, it was found that, in the case of a 50% compression ratio for an MPEG-2 decoder, optimum signal-to-noise results were obtained when the respective values of UPD1–UPD4 were multiplied by 4, 8.75, 14.75 and 14.75. The resultant values DQD1–DQD4 are respectively represented by 8-bit, i.e. 32-bits in total. It should be noted that the resultant values DQD1–DQD4 can, after dequantisation, also have their values clamped by range clamping circuitry (not illustrated).

In the frequency domain the dequantised data item: DQD1 represents an unsigned DC coefficient; DQD2 represents a low frequency signed AC coefficient; and DQD3 and DQD4 represent signed high frequency AC coefficiants.

It should be again noted at this stage, depending upon a particular application, one or more of the frequency coefficents could be ommitted from the following inverse transform or range clamping stage in order to suit the particular application and the degree of optimisation required.

The circuitry 410 for inverse transforming the four sets of data items DQD1–DQD4, received from the deauantising circuitry 405, and providing inverse transformed data items ITD1–ITD4, comprises three circuits for adding data items IADD1–IADD3 and three circuits for subtracting data items ISUB1–ISUB3.

Circuit IADD1 adds together the contents of the dequantised data DQD1 and DQD2 to produce a resultant IR1. Circuit ISUB1 subtracts the contents of DQD2 from the contents of DQD1 to produce a resultant IR2. Circuit IADD2 adds together the contents of the resultant IR1 and the dequantised data DQD3 to produce a resultant IR3. Circuit ISUB2 subtracts the dequantised data DQD3 from the resultant IR1 to produce a resultant IR4. Circuit IADD3 adds together the dequantised data DQD4 and the resultant IR2 to produce a resultant IR5. Circuit ISUB3 subtracts the dequantised data DQD4 from the resultant IR2 to produce a resultant IR6.

Due to the mathematics, which is explained in more detail below, used to obtain the resultants: IR3 and IR4 appear as signed data item of ten bits; and IR5 and IR6 appear as signed data items each of nine bits.

According to the application of the present invention, it is preferable, although not strictly necessary, to rang clamp the inverse transformed data items ITD1–ITD4 to their original range of 0 to 255, i.e. to a bit size of 8-bits, by the use of the range clamp circuitry 420.

The required mathematics to perform the compression and decompression is based upon matricies and is illustrated in equations 1–21.

Equations 1–8 are the definitions of a transform matrix when performing compression.

$$DC_1 = [½ \ ½];  \quad \text{Equation 1.}$$

$$Q_1 = [0 \ 0];  \quad \text{Equation 2.}$$

$$AC_1 = [½ \ -½];  \quad \text{Equation 3.}$$

$$Z_1 = [0 \ 0];  \quad \text{Equation 4.}$$

$$DC_P = ½[DC_{P-1} \ DC_{P-1}];  \quad \text{Equation 5.}$$

$$Q_P = [Q_{P-1} \ Q_{P-1}];  \quad \text{Equation 6.}$$

$$AC_P = 1/2DC_{P-1} - 1/2DC_{P-1}; \text{ and} \quad \text{Equation 7}$$

$$\begin{bmatrix} AC_{P-1} & Z_{P-1} \\ Z_{P-1} & AC_{P-1} \end{bmatrix}.$$

$$Z_P = \begin{bmatrix} Q_{P-1} & Q_{P-1} \\ Z_{P-1} & Z_{P-1} \\ Z_{P-1} & Z_{P-1} \end{bmatrix}. \quad \text{Equation 8}$$

Equation 9 is the definition of a compression transform matrix $T_P$, where P is an integer greater than or equal to two.

$$T_P = \begin{bmatrix} DC_P \\ AC_P \end{bmatrix}. \quad \text{Equation 9}$$

Equation 10 illustrates the transform matrix $T_P$ of equation 9, where P=2, i.e. a 4×4 transform matrix.

$$T_2 = \begin{bmatrix} 1/4 & 1/4 & 1/4 & 1/4 \\ 1/4 & 1/4 & -1/4 & -1/4 \\ 1/2 & -1/2 & 0 & 0 \\ 0 & 0 & 1/2 & -1/2 \end{bmatrix}. \quad \text{Equation 10}$$

It should be noted that the fractional values in equation 10 can be factored out as illustrated in equation 11.

$$T_2 = \begin{bmatrix} 1/4 & 0 & 0 & 0 & 1 & 1 & 1 & 1 \\ 0 & 1/4 & 0 & 0 & 1 & 1 & -1 & -1 \\ 0 & 0 & 1/2 & 0 & 1 & -1 & 0 & 0 \\ 0 & 0 & 0 & 1/2 & 0 & 0 & 1 & -1 \end{bmatrix} \quad \text{Equation 11}$$

The no-nfractional matrix terms of equation 11 correspond to the add and subtract functions as illustrated in the circuitry 300 of FIG. 5 and the fractional matrix terms of this equation correspond to the truncation, performed by the circuitry 315 of FIG. 5, of the transformed data items TD1–TD4. It should be noted that a the ¼ (quarter) term is the equivalent of a shift-right by places, i.e. what is required to truncate 10-Bits to 8-bits and that a the ½ (half) term is the equivalent of a shift-right by one place, i.e. what is requivalent to truncate 9-Bits to 8-bits.

Equations 12–19 are the definitions of an inverse transform matrix when performing decompression.

$$DC_1 = \begin{bmatrix} 1 \\ 1 \end{bmatrix}. \quad \text{Equation 12}$$

-continued $$IQ_1 = \begin{bmatrix} 0 \\ 0 \end{bmatrix}.$$ Equation 13

$$IAC_1 = \begin{bmatrix} 1 \\ -1 \end{bmatrix}.$$ Equation 14

$$IZ_1 = \begin{bmatrix} 0 \\ 0 \end{bmatrix}.$$ Equation 15

$$IDC_P = \begin{bmatrix} IDC_{P-1} \\ IDC_{P-1} \end{bmatrix}.$$ Equation 16

$$IQ_P = \begin{bmatrix} IQ_{P-1} \\ IQ_{P-1} \end{bmatrix}.$$ Equation 17

$$IAC_P = \begin{bmatrix} IDC_{P-1} & IAC_{P-1} & IZ_{P-1} \\ IDC_{P-1} & IZ_{P-1} & AC_{P-1} \end{bmatrix}.$$ Equation 18

$$IAC_P = \begin{bmatrix} IQ_{P-1} & IZ_{P-1} & IZ_{P-1} \\ IQ_{P-1} & IZ_{P-1} & IZ_{P-1} \end{bmatrix}.$$ Equation 19

Equation 20 is the definition of an inverse transform matrix $IT_P$, where P is an interger greater than or equal to two.

$$IT_P = \begin{bmatrix} DC_P \\ AC_P \end{bmatrix}.$$ Equation 20

Equation 21 illustrates the transform matrix $T_P$ of equation 20 where P=2, i.e. a 4×4 matrix.

$$\begin{bmatrix} T_2 = 1 & 1 & 1 & 0 \\ 1 & 1 & -1 & 0 \\ 1 & -1 & 0 & 1 \\ 1 & -1 & 0 & -1 \end{bmatrix}.$$ Equation 21

According to the present invention, it is also possible that the compression ratios for compressing any of the data items may be different. Furthermore, it is also possible to the present invention that the data items to be compressed is RGB or digital audio for example.

It should be noted that the principle of the present invention can be carried out using software as an alternative, or in addition, to hardware, i.e. logic gates. A software solution is a necessity for the emerging MPEG-4 standards. Key routines of a software solution is illustrated in Annex 2.

As stated above, the present invention has been described in connection with certain preferred embodiments relating to an example of an MPEG-2 decoder, but it should be understood that the present disclosure is to be considered as an exemplification of the principles of the invention and that there is no intention of limiting the invention to the disclosed embodiments or the illustrated application. Furthermore, it will be understood by those skilled in the art that the present invention may be used in other applications including, but not limited to, image and audio broadcasting such as video conferencing, mobile communications, satellite communications etc. It is therefore intended that all alternatives, modifications and equivalent arrangements as may be included within the spirit and scope of the appended claims be covered as part of this invention.

ANNEX-SHEET 1/2

```
/* PSNR calculate the PSNR (Peak Signal to Noise Ratio) between two
    sequences of files */
#include <stdio.h>
#include <math.h>
#include <string.h>
/* Calculate the PSNR between two files */
double psnr_files (FILE *signal1, FILE *signal2)
    double psnr = 0.0;
    long samples = 0;
    long err;
    long err_sq = 0;
    /* File mean of the square of the error */
    while (!feof (signal1) && !feof (signal2))
    {
        err = fgetc (signal1)-fgetc (signal2);
        err_sq += err * err;
        samples ++;
    }
    if (!.feof (signal1) || !feof (signal2))
        fprintf (stderr, "File size differs\n");
    /* Find the PSNR */
    if (err_sq == 0 || samples == 0)
        psnr = MAXDOUBLE;
    else
        psnr = (255.0 * 255.0 * (double) samples/((double) err_sq));
        psnr = 10 * log10 (psnr);
    return psnr;
}
main (int argc, char **argv)
{
    int frame;
    char field;
    char fn1 [256], fn2 [256];
    char old_fn1 [256], old_fn2 [256];
    FILE *file1, *file2;
    double psnr;
```

-continued

```
    if (argc != 3)
    {
        fprintf (stderr, "\n%s: Find the Peak Signal to Noise Ratio of two sequences
        of image);
        fprintf (stderr, "Usage: %s <file-seq1> <file-seq2>\n", argv[0]);
        fprintf (stderr, "Where <file-seq> is a printf format string with %%d and
        %%c: \n");
        fprintf (stderr, "\t%%d is the frame number starting at 0;\n");
        fprintf (stderr, "\t%%c is the field letter a or b.\n");
        fprintf (stderr, "Example: %s f%%06%%c g%%06%%c\n\n", argv[0]);
        exit (1);
    }
/* Setup old filenames */
old_fn1 = '\n';
old_fn2 = '\n';
```

<u>ANNEX 1-SHEET 2/2</u>

```
/* Setup the frame number and field value */
frame = 0;
field = 'a';
while (1)
{
    sprintf (fn1, argv [1], frame, field);
    sprintf (fn2, argv [2], frame, field);
    if (!strcmp (fn1, old_fn1) || !strcmp (fn2, old_fn2))
    {
        /* Filename is the same as the last one, could have %c omitted or both
            %d & %c. So if field is 'a' and filename is the same then both
            %d & %c omitted so exit the loop */
        if (field == 'a')
            break;
    }
    else
    {
        /* Process only if the filenames are different from the previous ones */
        /* Open the files */
        file1 = fopen (fn1, "r");
        if (file1 == NULL)
        {
            fprintf (stderr, "Can't open file: %s\n", fn1);
            break;
        }
        file2 = fopen (fn2, "r");
        if (file2 == NULL)
        {
            fprintf (stderr, "Can't open file: %s\n", fn2);
            fclose (file1);
            break;
        }
        psnr = psnr_files (file1, file2);
        printf ("PSNR of %s and %s = %lf\n", fn1, fn2, psnr);
        fclose (file2);
        fclose (file1);
    }
    /* Increment the field or frame number */
    if (field == 'a')
        field = 'b';
    else
    {
        field = 'a';
        frame++;
    }
    /* Copy current filename to old filenames */
    strcpy (old_fn1, fn1);
    strcpy (old_fn2, fn2);
}
}
```

<u>ANNEX 2-SHEET 1/6</u>

```
/* transform.cc-Memory reduction routines
 * Written by Anthony Cole (C) 1996 Copyright SGS-Thomson
 */                Microelectronics Ltd.
struct Row8
{
        unsigned char pix [8];
};
struct Row4
{
        unsigned char pix [4];
};
```

-continued

```
static Row4 transform (Row4& vin)
{
        int v[4], t[4];
        int ctr;
/*---   Convert to integers */
        for (ctr = 0; ctr < 4; ctr++)
                v[ctr] = (unsigned int)vin.pix[ctr];   /* Range 0 to 255 */
/*---   Perform the transform */
        t[0] = v[0] + v[1] + v[2] + v[3];
        t[1] = v[0] + v[1] - v[2] - v[3];
        t[2] = v[0] - v[1]                         ;
        t[3] =                v[2] - v[3];
/*---   Round, divide by 4, 4, 2 and 2 */
        static int add [ ] = { 4, 4, 2, 2 };
        static int sft [ ] = { 2, 2, 1, 1 };
        for (ctr = 0; ctr < 8; ctr++)
            {
#ifdef ROUNDING
            t[ctr] += (t[ctr] >= 0) ? add [ctr] : -add [ctr];
#endif
            t[ctr] >>= sft [ctr];
        }
        if (t[0] > 255)
            t[0] = 255;
        else if (t[0] < 0)
            t[0] = 0;
        for (ctr = 1; ctr < 4; ctr++)
        {
            if (t[ctr] > 127)
                t[ctr] = 127;
            else if (t[ctr] < -128)
                t[ctr] = -128;
        }
/*      t[0] has the range 0 to 255; t[1 to 7] has the range -128 to 127 */
/*---   Convert to unsigned char (truncate to 8 bits) and return */
        Row4 ret_val;
        for (ctr = 0; ctr < 4; ctr++)
                ret_val.pix[ctr] = (unsigned char) (t[ctr]&0xff);
        return ret_val;
}
static Row4 itransform (Row4& vin)
{
        int v[4], t[4];
        int ctr;
                        ANNEX 2-SHEET 2/6

/*---   Convert to integers */
/*      pix[0] has the range 0 to 255; pix[1 to 7] has the range -128 to 127 */
        v[0] = (unsigned int)vin.pix[0];       /* Range 0 to 255 */
        for (ctr = 1; ctr < 4; ctr++)
                v[ctr] = (char)vin.pix[ctr] /* Sign excend. Range -128 to 127 */
/*---   Perform the inverse transform */
        t[0] = v[0] + v[1] + v[2]          ;
        t[1] = v[0] + v[1] - v[2]          ;
        t[2] = v[0] - v[1]        + v[3];
        t[3] = v[0] - v[1]        - v[3];
/*---   Clamp to 0 to 255 */
        for (ctr = 0; ctr < 4; ctr++)
        {
            if (t[ctr] > 255)
                t[ctr] = 255;
            else if (t[ctr] < 0)
                t[ctr] = 0;
        }
/*---   Convert to unsigned char and return */
        Row4 ret_val;
        for (ctr = 0; ctr < 4; ctr++)
                ret_val.pix[ctr] = (unsigned char) t[ctr];
        return ret_val;
}
static Row8 transform (Row8& vin)
{
        int v[8], t[8];
        int ctr;
/*---   Convert to integers */
        for (ctr = 0; ctr < 8; ctr++)
                v[ctr] = (unsigned int)vin.pix[ctr]; /* Range 0 to 255 */
/*---   Perform the transform */
        t[0] = v[0] + v[1] + v[2] + v[3] + v[4] + v[5] + v[6] + v[7];
```

-continued

```
            t[1] = v[0] + v[1] + v[2] + v[3] - v[4] - v[5] - v[6] - v[7];
            t[2] = v[0] + v[1] - v[2] - v[3]                              ;
            t[3] =                             v[4] + v[5] - v[6] - v[7];
            t[4] = v[0] - v[1]                                            ;
            t[5] =             v[2] - v[3]                                ;
            t[6] =                             v[4] - v[5]                ;
            t[7] =                                           v[6] - v[7]
/*---   Round, divide by 8, 8, 4, 4, 2, 2, 2 and 2 */
        static int add [0] = { 4, 4, 2, 2, 1, 1, 1, 1 };
        static int sft [0] = { 3, 3, 2, 2, 1, 1, 1, 1 };
        for (ctr = 0; ctr < 8; ctr++)
        {
#ifdef ROUNDING
/*          t[ctr] += (t[ctr] >= 0) ? add [ctr] : -add [ctr]; */
            t[ctr] += (t[ctr] >= 0) ? add [ctr] : 0; /* away from zero */
#endif
            t[ctr] = sft [ctr];
        }
                        ANNEX 2-SHEET 3/6

/*---   Clamp */
        if (t[0] > 255)
            t[0] = 255;
        else if (t[0] < 0)
            t[0] = 0;
        for (ctr = 1; ctr < 8; ctr++)
        {
            if (t[ctr] > 127)
                t[ctr] = 127;
            else if (t[ctr] < -128)
                t[ctr] = -128;
        }
/*      t[0] has the range 0 to 255; t[1 to 7] has the range -128 to 127 */
/*---   Convert to unsigned char (truncate to 8 bits) and return */
        Row8 ret_val;
        for (ctr = 0; ctr < 8; ctr++)
            ret_val.pix[ctr] = (unsigned char) (t[ctr]&0xff);
        return ret_val;
}
static Row8 itransform (Row8& vin)
{
        int v[8], t[8];
        int ctr;
/*---   Convert to integers */
/*      pix[0] has the range 0 to 255; pix[1 to 7] has the range -128 to 127 */
        v[0] = (unsigned int)vin.pix[0] /* Range 0 to 255 */
        for (ctr = 1; ctr < 8; ctr++)
            v[ctr] = (char)vin.pix[ctr]; /* Sign extend Range -128 to 127 */
/*---   Perform the inverse transform */
        t[0] = v[0] + v[1] + v[2]        + v[4]                         ;
        t[1] = v[0] + v[1] + v[2]        - v[4]                         ;
        t[2] = v[0] + v[1] - v[2]                 + v[5]                ;
        t[3] = v[0] + v[1] - v[2]                 - v[5]                ;
        t[4] = v[0] - v[1]        + v[3]                 + v[6]         ;
        t[5] = v[0] - v[1]        + v[3]                 - v[6]         ;
        t[6] = v[0] - v[1]        - v[3]                          + v[7];
        t[7] = v[0] - v[1]        - v[3]                          - v[7];
/*---   Clamp to 0 to 255 */
        for (ctr = 0; ctr < 8; ctr++)
        {
            if (t[ctr] > 255)
                t[ctr] = 255;
            else if (t[ctr] < 0)
                t[ctr] = 0;
        }
/*---   Convert to unsigned char and return */
        Row8 ret_val;
        for (ctr = 0; ctr < 8; ctr++)
            ret_val.pix[ctr] = (unsigned char) t[ctr];
        return ret_val;
Linear Unsigned LUT */
tic void create_lin_us_lut (t_lut *lut, t_lut *inv_lut,
                    unsigned int num_bits, double quant)
                        ANNEX 2-SHEET 4/6 int ctr;
    int val, ival;
    int max, min;
    int mask;
```

```
/* Special case for 0 bits */
if (num_bits <= 0)
{
    for (ctr = 0; ctr < 256; ctr++)
        lut->tab [ctr] inv_lut->tab [ctr] = 0;
    return;
}
/* Keep in a sensible range */
if (num_bits > 8)
    num_bits = 8;
else if (num_bits <= 0)
    num_bits = 1;
/* Calculate Max and Min signed values */
min = 0;
max = (1 >> num_bits) - 1;
/* Calculate the mask */
mask = (1 << num_bits) - 1;
/* Create LUT */
for (ctr = 0; ctr < 256; ctr++)
{
    /* CALCULATE LUT */
    val = (int) ((double) ctr/quant + 0.5);
    /* Clamp to the num_bits range (signed) */
    if (val > max)
        val = max;
    else if (val < min)
        val = min;
    /* Write value to LUT */
    lut->tab [ctr & 255] = val & mask;
    /* CALCULATE INVERSE LUT */
    ival = (int) ((double) val * quant);
    /* Clamp to unsigned range */
    if (ival > 255)
        ival = 255;
    else if (ival < 0)
        ival = 0;
    /* Write to Inverse LUT */
    inv_lut->tab [val & mask] = ival & 255;
}
atic void create_lin_ lut (t_lut *lut, t_lut *inv_lut,
                              unsigned int num_bits, double quant)
int ctr;
int val, ival;
int max, min;
nt mask;
```

ANNEX 2-SHEET 5/6

```
    /* Special case for 0 bits */
    if (num_bits <= 0)
    {
        for (ctr = 0; ctr < 256; ctr++)
            lut->tab [ctr] = inv_lut->tab [ctr] = 0;
        return;
    }
    /* Keep in a sensible range */
    if (num_bits > 8)
        num_bits = 8;
    else if (num_bits <= 0)
        num_bits = 1;
    /* Calculate Max and Min signed values */
    min = -(1 << (num_bits - 1));
    max = (1 << (num_bits - 1)) - 1;
    /* Calculate the mask */
    mask = (1 << num_bits) - 1;
    /* Create LUT */
    for (ctr = -128; ctr < 128; ctr++)
    {
        if (ctr >= 0)
            val = (int) ((double) ctr/quant + 0.5);
        else
            val = (int) ((double) ctr/quant - 0.5);
        /* Clamp to the num_bits range (signed) */
        if (val > max)
            val = max;
        else if (val < min)
            val = min;
        /* Write value to LUT */
        lut->tab [ctr & 255] = val & mask;
        /* CALCULATE INVERSE LUT */
```

-continued

```
            if (val >= 0.0)
                ival = (int) ((double) val * quant);
            else
                ival = (int) ((double) val * quant);
            /* Clamp to signed range */
            if (ival > 127)
                ival = 127;
            else if (ival < -128)
                ival = -128;
            /* Write to Inverse LUT */
            inv_lut->tab [val & mask] = ival & 255;
}
atic void create_log_lut (t_lut *lut, t_lut *inv_lut,
                        unsigned int num_bits, double quant)
nt ctr;
nt val, ival;
nt max, min;
nt mask;
ouble range;
ouble scale;
```

ANNEX 2-SHEET 6/6

```
/* Special case for 0 bits */
if (num_bits <= 0)
{
    for (ctr = 0; ctr < 256; ctr++)
        lut->tab [ctr] inv_lut->tab [ctr] = 0;
    return;
}
/* Keep in a sensible range */
if (num_bits > 8)
    num_bits == 8;
else if (num_bits <= 0)
    num_bits = 1;
/* Calculate Max and Min signed values */
min = -(1 << (num_bits - 1));
max = (1 << (num_bits - 1)) - 1;
/* Calculate the mask */
mask = (1 << num_bits) - 1;
/* Calculate the maximum (positive) range of the LUT"s values
    i.e. for an 8-bit number range = 127 */
range = 128.0/quant + 0.5 - 1.0;
/* Calculate the scaling value so the log values fill the range of the
    LUT values */
scale = range/log (128.0);
/* Create LUT */
for (ctr = -128; ctr < 128; ctr++)
{
    if (ctr >= 0)
        /* +ve values 0 to 127 (1 to 128 as we can't take log of 0) */
        val = (int) (log (ctr + 1) * scale + 0.5);
    else
/* -ve values -1 to -128 (1 to 128 as we can't take log of -ve numbers) */
val = -(int) (log (-ctr) * scale + 0.5);
/* Clamp to the num_bits range (signed) */
if (val > max)
    val = max;
else if (val < min)
    val = min;
/* Write value to LUT */
lut->tab [ctr & 255] = val & mask;
/* CALCULATE INVERSE LUT */
if (val >= 0)
    ival = (int) (exp ((double) val/scale) + 0.5) - 1;
else
    ival = (int) (-exp (-(double) val/scale) - 0.5);
/* Clamp to signed range */
if (ival > 127)
    ival = 127;
else if (ival < -128)
    ival = -128;
/* Write to Inverse LUT */
inv_lut->tab [val & mask] = ival & 255;
```

What is claimed is:

1. Circuitry for processing digital data items, including compression circuitry and decompression circuitry, wherein said compression circuitry comprises:

a circuit for receiving and transforming a plurality of M first data items into a group of N second data items, where M is an integer greater than or equal to two and where N is an integer less than or equal to M;

a circuit for receiving and quantising a set of P said second data items and producing a group of Q third data items, where P is an integer less than or equal to N and where Q is an integer less than or equal to P;

a circuit for range clamping the group of Q third data items and producing a group of Q' third range clamped data items, wherein the circuitry for range clamping is arranged to convert signed data to unsigned data comprising fewer buts such that Q' is an integer less than Q and a circuit for appropriately storing in memory and/or transferring a set of R said third range clamped data items; where the integer R is less than or equal to Q, said decompression circuitry comprises:

a circuit for appropriately retrieving from memory and/or receiving a group of S first stored or transferred data items, where S is greater than or equal to R;

a circuit for receiving and dequantising a set of T said first stored or transferred data items and producing a group of U dequantised second data items, where T is greater than or equal to S and U is greater than or equal to T; and a circuit for receiving and inverse transforming a group of V second data items into a group of W third data items, where V is greater than or equal to U and where W is greater than or equal to V, said a group of W third data items being representative of said plurality M of first data items.

2. Circuitry according to claim 1, wherein the compression circuitry further comprises a circuit for truncating the group of the N second data items and producing the group of N' second truncated data items, where N' is an integer less than or equal to N and where the integer P is less than or equal to N'.

3. Circuitry according to claim 1, wherein the decompression circuitry further comprises a circuit for range clamping the group of W third data items and producing a group of W' third range clamped data items, where W' is an integer less than or equal to W, said W' third range clamped data items being representative of said M first data items.

4. Circuitry according to claim 1, wherein the number M of first data items equals $2^Y$, where Y is an integer greater than or equal to one.

5. Circuitry according to claim 1, wherein the group of P second data items are quantised independently of each other and the group of T first data items are dequantised independently of each other.

6. Circuitry according to claim 1, wherein it is incorporated or used in a system or apparatus.

7. A system or apparatus according to claim 6, wherein it is, or that it is incorporated within, or that it is used in conjunction with, a computer.

8. A system or apparatus according to claim 6, wherein it is, or it is incorporated within, or it is used in conjunction with, a domestic or consumer appliance.

9. A system or apparatus according to claim 6, wherein it is incorporated within, or that it is used in conjunction with, a vehicle.

10. A system or apparatus according to claim 6, wherein it is, or it is incorporated within, or it is used in conjunction with, a telephone or a telephone network.

11. An MPEG decoder for processing digital video/image data items, including compression circuitry and decompression circuitry, said compression circuitry comprising:

a circuit for receiving and transforming a plurality of M first video/image data items into a group of N second video/image data items, where M is an integer greater than or equal to two and where N is an integer less than or equal to M;

a circuit for receiving and quantising a set of P second video/image data items and producing a group of Q third video/image data items, where P is an integer less than or equal to N and where Q is an integer less than or equal to P;

a circuit for range clamping the group of Q third video/image data items and producing a group of Q' third range clamped video/image data items, wherein the circuit for range clamping is arranged to convert signed data to unsigned data comprising fewer bits such that Q' is an integer less than Q; and a circuit for appropriately storing in memory and/or transferring a set of R said third range clamped video/image data items; where the integer R is less than or equal to Q', said decompression circuitry comprising:

a circuit for appropriately retrieving from memory and/or receiving a group of S first stored or transferred video/image data items, where S is greater than or equal to R;

a circuit for receiving and dequantising a set of T said first stored or transferred video/image data items and producing a group of U dequantised second video/image data items, where T is greater than or equal to S and U is greater than or equal to T; and a circuit for receiving and inverse transforming a group of V second video/image data items into a group of W third video/image data items, where V is greater than or equal to U and where W is greater than or equal to V, said group of W third video/image data items being representative of said plurality M of first video/image data items.

12. Circuitry according to claim 11, wherein the compression circuitry further comprises a circuit for truncating the group of N second video/image data items and producing a group of N' second truncated video/image data items, where N' is an integer less than or equal to N and where the integer P is less than or equal to N'.

13. Circuitry according to claim 11, wherein the decompression circuitry further comprises a circuit for range clamping the group of W third video/image data items and producing a group of W' third range clamped video/image data items, where W' is an integer less than or equal to W, said group of W' third range clamped video/image data items being representative of said group of M first video/image data items.

14. Circuitry according to claim 11, wherein the number M of first video/image data items equals 2Y, where Y is an integer greater than or equal to one.

15. Circuitry according to claim 11, wherein the group of P second video/image data items are quantised independently of each other and the group of T first video/image data items are dequantised independently of each other.

16. A method for processing digital data items, including the steps of compressing and decompressing the digital data items, said compression comprising the steps of:

receiving and transforming a plurality of M first data items into a group of N second data items, where M is an integer greater than or equal to two and where N is an integer less than or equal to M;

receiving and quantising a set of P said second data items and producing Q a group of third data items, where P is an integer less than or equal to N and where Q is an integer less than or equal to P;

range clamping the group of Q third data items and producing a group of Q' third range clamped data items, wherein the circuit for range clamping is arranged to convert signed data to unsigned data comprising fewer bits such that Q' is an integer less than Q; and appropriately storing in memory and/or transferring a set of R said third range clamped data items; where the integer R is less than or equal to Q', said decompression comprising the steps of:

appropriately retrieving from memory and/or receiving a group of S first stored or transferred data items, where S is greater than or equal to R;

receiving and dequantising a set of T said first stored or transferred data items and producing a group of U dequantised second data items, where T is greater than or equal to S and U is greater than or equal to T; and receiving and inverse transforming a group of V second data items into a group of W third data items, where V is greater than or equal to U and where W is greater than or equal to V, said group of W third data items being representative of said plurality M of first data items.

17. A method according to claim 16, wherein the compression step further comprises a step for truncating the group of N second data items and producing a group of N' second truncated data items, where N' is an integer less than or equal to N and where the integer P is less than or equal to N'.

18. A method according to claim 16, wherein the decompression step further comprises a step for range clamping the group of W third data items and producing a group of W' third range clamped data items, where W' is an integer less than or equal to W, said W' third range clamped data items being representative of said M first data items.

19. A method according to claim 16, wherein the number M of first data items equals $2^Y$, where Y is an integer greater than or equal to one.

20. A method according to claim 16, wherein the group of P second data items are quantised independently of each other and the group of T first data items are dequantised independently of each other.

21. A method according to claim 16, wherein it is incorporated or used in a system or apparatus.

22. A system or apparatus according to claim 21, characterised in that it is, or that it is incorporated within, or that it is used in conjunction with, a computer.

23. A system or apparatus according to claim 21, characterised in that it is, or that it is incorporated within, or that it is used in conjunction with, a domestic or consumer appliance.

24. A system or apparatus according to claim 21, characterised in that it is incorporated within, or that it is used in conjunction with, a vehicle.

25. A system or apparatus according to claim 21, characterised in that it is, or that it is incorporated within, or that it is used in conjunction with, a telephone or a telephone network.

26. A method for processing digital video/image data items in an MPEG decoder, including the steps of compressing and decompressing the digital video/image data items, said compression comprising the steps of:

receiving and transforming a plurality of M first video/image data items into a group of N second video/image data items, where M is an integer greater than or equal to two and where N is an integer less than or equal to M;

receiving and quantising a set of P said second video/image data items and producing a group of Q third video/image data items, where P is an integer less than or equal to N and where Q is an integer less than or equal to P;

range clamping the a group of Q third video/image data items and producing a group of Q' third range clamped video/image data items, wherein the circuit for range clamping is arranged to convert signed data to unsigned data comprising fewer bits such that Q' is an integer less than Q; and appropriately storing in memory and/or transferring a set of R said third range clamped video/image data items; where the integer R is less than or equal to Q', said decompression step comprising the steps of:

appropriately retrieving from memory and/or receiving a group of S first stored or transferred video/image data items, where S is greater than or equal to R;

receiving and dequantising a set of T said first stored or transferred video/image data items and producing a group of U dequantised second video/image data items, where T is greater than or equal to S and U is greater than or equal to T; and receiving and inverse transforming a group of V second video/image data items into a group of W third video/image data items, where V is greater than or equal to U and where W is greater than or equal to V, said group of W third video/image data items being representative of said plurality M of first video/image data items.

27. A method according to claim 19, wherein the compression step further comprises a step for truncating the group of N second video/image data items and producing a group of N' second truncated video/image data items, where N' is an integer less than or equal to N and where the integer P is less than or equal to N'.

28. A method according to claim 26, wherein the decompression step further comprises a step for range clamping the group of W third video/image data items and producing a group of W' third range clamped video/image data items, where W' is an integer less than or equal to W, said group of W' third range clamped video/image data items being representative of said group of M first video/image data items.

29. A method according to claim 26, wherein the number M of first video/image data items equals 2Y, where Y is at integer greater than or equal to one.

30. A method according to claim 26, wherein the group of P second video/image data items are quantised independently of each other and the group of T first video/image data items are dequantised independently of each other.

* * * * *

UNITED STATES PATENT AND TRADEMARK OFFICE
CERTIFICATE OF CORRECTION

PATENT NO. : 6,204,780 B1
DATED : March 20, 2001
INVENTOR(S) : Anthony James Carvallo Cole It is certified that error appears in the above-identified patent and that said Letters Patent is hereby corrected as shown below:

Column 12,
Line 1, Equation 21 should read as shown below:

Equation 21
$$T_2 = \begin{bmatrix} 1 & 1 & 1 & 0 \\ 1 & 1 & -1 & 0 \\ 1 & -1 & 0 & 1 \\ 1 & -1 & 0 & -1 \end{bmatrix}$$

Signed and Sealed this

Thirtieth Day of October, 2001

Attest:

*Attesting Officer*

NICHOLAS P. GODICI
*Acting Director of the United States Patent and Trademark Office*